United States Patent [19]
Müller et al.

[11] Patent Number: 4,501,171
[45] Date of Patent: Feb. 26, 1985

[54] CONTROL OF THE SHIFT POINTS OF AN AUTOMATIC TRANSMISSION FOR TEMPORARY ACCELERATION INCREASE

[75] Inventors: Alfred Müller, Leonberg; Manfred Schwab, Gerlingen, both of Fed. Rep. of Germany

[73] Assignee: Robert Bosch GmbH, Stuttgart, Fed. Rep. of Germany

[21] Appl. No.: 429,222

[22] Filed: Sep. 30, 1982

[30] Foreign Application Priority Data

Oct. 7, 1981 [DE] Fed. Rep. of Germany ....... 3139838

[51] Int. Cl.³ .............................................. B60K 41/10
[52] U.S. Cl. .......................................... 74/866; 74/877
[58] Field of Search ................ 74/866, 865, 863, 862, 74/861, 860, 870, 877; 364/424.1

[56] References Cited

U.S. PATENT DOCUMENTS

| 3,673,892 | 7/1972 | Kato et al. | 74/866 X |
|---|---|---|---|
| 3,726,159 | 4/1973 | Mizote | 74/866 |
| 3,732,754 | 5/1973 | Mori | 74/866 |
| 3,785,224 | 1/1974 | Will | 74/865 |
| 4,134,312 | 1/1979 | Iijima | 74/865 |
| 4,253,348 | 3/1981 | Will et al. | 74/866 |
| 4,294,341 | 10/1981 | Swart | 74/866 X |
| 4,369,676 | 1/1983 | Gaus | 74/865 X |
| 4,412,290 | 10/1983 | Pannier | 74/866 X |

FOREIGN PATENT DOCUMENTS 1555170 12/1970 Fed. Rep. of Germany.
2518075 11/1975 Fed. Rep. of Germany ........ 74/865

Primary Examiner—Leslie A. Braun
Assistant Examiner—Arthur T. Quiray
Attorney, Agent, or Firm—Frishauf, Holtz, Goodman & Woodward

[57] ABSTRACT

The kickdown function for modifying the operation of an automatic transmission to make the higher power of a lower gear more extensively available is arranged to take place in response to several operating parameters only one of which is the operation of a kickdown switch and the normal gear pattern is restored likewise in response to any one of several parameters. The function is thus more flexibly adapted to driving conditions and avoids the excessive shifting between gear ratios that may result from more rigidly designed kickdown systems.

2 Claims, 2 Drawing Figures

CONTROL OF THE SHIFT POINTS OF AN AUTOMATIC TRANSMISSION FOR TEMPORARY ACCELERATION INCREASE This invention concerns the control of an automatic transmission of a motor vehicle for temporarily raising the vehicle velocity at which a gearshift operation takes place in order to enable the driver to have the benefit of additional acceleration capability resulting from the use of a lower gear.

It is known to provide such operation of an automatic transmission of a motor vehicle by a so-called kickdown function. By such a function is understood the shifting of the gearshift pattern of the automatic transmission towards higher vehicle speeds whenever a kickdown switch, which is usually operated in the end position of the accelerator pedal, operates. In this way it is made possible for the driver of an automatic shift vehicle to bring a lower gear into operation so that a greater engine power becomes available in the lower gear for acceleration or overtaking purposes than would be available on the normal basis of the shift pattern of the automatic transmission.

It is also known from German published patent application DE-OS No. 15 55 170 to initiate a kickdown function of that sort in accordance with how fast the accelerator pedal is pressed down.

The known devices have the disadvantage, however, that the kickdown function remains switched in only so long as the accelerator pedal is pressed down all the way. If thereafter the accelerator pedal is only slightly drawn back during kickdown operation, the gearshift immediately shifts back into the higher gear and the high engine power expected to be necessary is no longer available.

Since the switching in of kickdown likewise takes place only with the accelerator pedal fully pressed down, there is necessarily a greater power difference before and after switching-in of the kickdown that can be greater than the power difference in fact required. This can lead to continual back and forth shifting (pendulum shifting) in particular driving situations.

Finally, another system is disclosed in U.S. Pat. No. 4,134,312 in which the kickdown function is initiated by an ordinary switch, but is switched out again only when a prescribed lower value of engine load is reached. For this purpose a hysteresis switch is used.

SUMMARY OF THE INVENTION

It is an object of the present invention to provide a kickdown function that is better suited to a variety of different driving conditions.

Briefly, this object is accomplished by providing that the offset of the shift speeds to higher values takes place upon occurence of either the increase of engine load above a predetermined threshold value, physical actuation of a switch operated by the accelerator pedal, or actuation of the accelerator pedal itself at a rate higher than a predetermined threshold depression rate, while the offset is terminated and the normal shift speeds restored either when a prescribed interval since the beginning of the offset has elapsed, when the engine load drops below a prescribed threshold, or when the engine speed passes either upwards or downwards through a predetermined threshold value of engine speed. The separate criteria may be partly combined instead of being used simply as alternatives.

The invention has the advantage that the power increase by onset of a kickdown condition is not rigidly fixed but is suited to the driving situation. There is a further advantage that there is a reduction of the number of shifting operations and thereby a reduction of fuel consumption.

BRIEF DESCRIPTION OF THE DRAWINGS

The invention is further described by way of illustrative example with reference to the annexed drawing, in which.

DESCRIPTION OF THE ILLUSTRATED EMBODIMENTS

Figure 1:
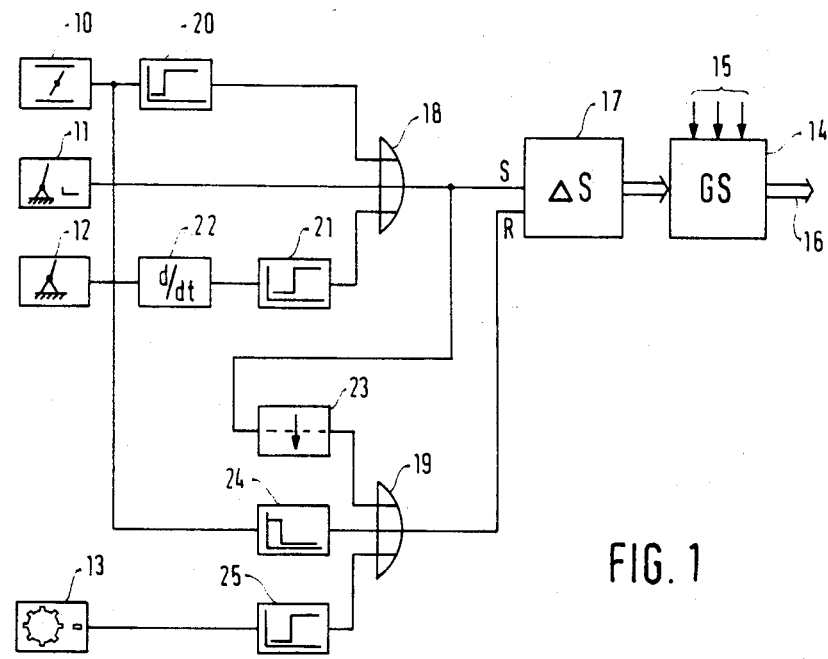
FIG. 1 is a circuit block diagram of an apparatus for practicing the invention.

The automatic transmission control system illustrated in FIG. 1 comprises on the input side a throttle valve position transducer 10, a kickdown switch 11, an accelerator position transducer 12 and a engine speed transducer 13. The signals furnished by these input devices 10 to 13 are supplied to an automatic transmission control unit 14 of a type that is in itself known and therefore does not need to be further described except to mention that it has usual inputs 15 which accept, for example, signals corresponding to vehicle speed, throttle valve position, selector lever position and so forth. The manner in which the signals of the input devices 10 to 13 are applied to the control 14 is further described below. The automatic transmission control unit 14 has an output 16 for operating in a known manner magnetic valves, pressure control valves, torque converter bridging couplings, or the like. It is not material how the output of the control unit 14 operates the automatic gearshift since the invention is applicable to all varieties of control of gearshifting in an automatic transmission.

The automatic transmission control unit 14 is preceded at its input by a shift pattern correction stage 17 by which the shift pattern, meaning the pattern of speeds at which the various shifts take place, which is built into the control unit 14, can be changed, for example by offsetting the pattern in whole or in part to higher speeds.

Figure 2:
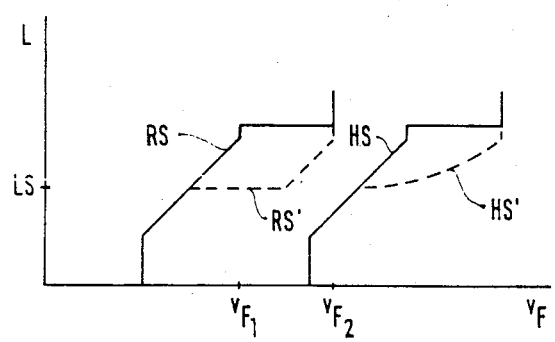
FIG. 2 is a comparison of the shift pattern of a conventional automatic transmission and the shift pattern of an automatic transmission operating in accordance with the invention.

A gearshift pattern for an automatic transmission is usually defined in terms of a characteristic field that can be plotted in terms of engine load L against vehicle speed $v_F$, in which field a characteristic curve (which may be made up of rectilinear segments) designates the boundary of the regions in which one or another of the gear ratios is to be used. FIG. 2 is such a diagram in which an upshift characteristic HS and a downshift characteristic RS are shown in solid lines. The region between the lines HS and RS is referred to as the shift hysteresis. The characteristics just referred to, drawn in solid lines, are those conventionally used and it is evident that these are so designed that for low values of engine load L the characteristic runs parallel to the ordinate and then for higher values of engine load runs obliquely until the load value 100% is reached. When this full load value is reached the kickdown KD can be activated in transmissions conventionally equipped, as the result of which the characteristic has the upper hook-shaped course. In the case of the downshift line RS, accordingly, the result is that the maximum vehicle speed at which downshifting is still possible is raised from vF1 to vF2.

Shift patterns of the kind shown in FIG. 2 are provided in moder microprocessor controlled automatic transmission controls by means of a coordinate field entered into a read-only memory. It is accordingly possible to vary these coordinate fields in a simple way by switching over from one coordinate field to another or at least by providing a parallel shift of the characteristic curve or line within a certain region of the coordinate field. In the first case any desired variations of the characteristic curves are obtainable, as is illustrated in FIG. 2 with the broken line HS', for example. It is to be understood that the modification of the characteristic curve for shift control does not need to be uniform for each rectilinear part of the switching characteristic, but rather that various modifications can be performed for upshift and downshift rectilinear pattern segments and that this may be done differently for the different steps ("gears" or modes) of the automatic transmission. The offsetting of the characteristic, which, according to the above discussion includes modifications of the shape of the characteristic as well as shifting at least some part of it over, is put into effect in the circuit of FIG. 1 by the shift pattern correction stage 17. The effect of this stage is that when the set input S receives a signal, the conventional or normal shift pattern HS, RS is offset or deformed to conform to the modified shift pattern sample HS', RS', to the extent the latter differs from the former, and when a signal is received at the reset input R, the shift pattern is changed back to the normal one designated HS, RS in FIG. 2.

The provision of a signal to activate the set input S is performed by the output of an OR-gate 18, to which inputs are provided respectively by the first threshold value stage 20 operating on the output of the throttle valve transducer 10, by the kickdown switch 11 and finally by the accelerator pedal transducer 12 acting through a differentiating circuit 22 and a threshold circuit 21. This means that a switchover of the shift pattern is introduced whenever at least one of the following conditions is fulfilled:

(a) the engine load oversteps a prescribed threshold value (first threshold stage 20);

(b) the kickdown switch is actuated (11);

(c) the rate at which the accelerator pedal is pressed down exceeds a predetermined value (second threshold stage 21 with differentiating stage 22).

Correspondingly, the normal shift pattern is then restored by activation of the reset input R whenever an OR-gate 19 produces a signal in response to one of its inputs, which are a timing circuit 23 connected with the output of the OR-gate 18, a third threshold stage 24 connected to the output of the throttle valve position transducer 10 and, finally, a fourth threshold stage connected to the engine speed transducer 13. Consequently a restoration of the normal shift pattern is produced when at least one of the following conditions is fulfilled:

(d) a prescribed time interval has elapsed since switching over to the modified shift pattern (timing circuit 23);

(e) the engine load has dropped below a prescribed threshold value (third threshold stage 24);

(f) the engine speed passes through, either upwards or downwards, a specified threshold value (threshold stage 25).

It is of course evident that instead of the OR-gates 18 and 19 other logical interrelations of the individually named conditions (a), (b) and (c) on the one hand and (d), (e) and (f) could be provided, according to the nature or desired use of the vehicle, the desired manner of operation or the like. The method of operation according to the invention on the whole produces a much more discriminating actuation of the kickdown function that is to a great extent independent of the usual limited scope of the effect of simply operating or releasing a kickdown switch.

We claim:

1. Method of controlling the provision of a substantial discrete offset in a normal gearshift pattern of a vehicular automatic transmission interposed between an internal combustion engine and drive wheels of a vehicle, said engine having an accelerator pedal for increasing and reducing the power output of the engine during driving of the vehicle, said offset being constituted to put quickly at lower value the vehicle speed at which a shift to a lower gear for a given engine load is produced in response to operation of a switch when said accelerator pedal is fully depressed, compared to the value of vehicle speed at which said shift to a lower gear would occur at the same engine load in said normal gearshift pattern of said transmission, and to restore fully said normal gearshift pattern automatically thereafter, in which method, in accordance with the invention, a change of the condition of said switch resulting from reducing the amount of depression of said accelerator pedal has no responsive effect on the persistence of said offset;

said offset is also provided when the engine load oversteps a first predetermined threshold value of said engine load;

said offset is also provided when said accelerator is depressed at a rate that exceeds a predetermined rate;

said offset is terminated when a predetermined time has elapsed since said offset was provided;

said offset is terminated when the load of said engine has fallen below a second predetermined value of engine load;

said offset is terminated when the speed of said engine has increased beyond a first predetermined threshold value of engine speed, and said offset is terminated when the speed of said engine has decreased beyond a second predetermined threshold value of engine speed.

2. Apparatus for changing the gearshift pattern of a vehicle automatic transmission in response to driving conditions comprising:

means for producing a first signal when the engine load exceeds a predetermined threshold value thereof;

means for producing a second signal then an accelerator pedal control of said engine is fully depressed;

means for producing a third signal when said accelerator control is being depressed at a rate exceeding a predetermined rate;

means for producing a fourth signal whenever at least one of said first, second and third signals appears;

means for modifying the gearshift pattern of an automatic transmission towards initiation of at least one shift transition at a higher speed in response to the appearance of said fourth signal;

means for producing a fifth signal when a predetermined period of time has elapsed since a modification of said gear shift pattern of said transmission towards shifting at higher speed;

means for producting a sixth signal when the engine load falls below a predetermined load value;

means for producing a seventh signal when the engine speed passes through a predetermined value of engine speed regardless of the direction of change of engine speed;

means for producing an eighth signal in response to the appearance of any one of said fifth, sixth and seventh signals, and means for imposing restoration of the normal gearshift pattern of said automatic transmission in response to said signals.

* * * * *